(12) United States Patent
Togita

(10) Patent No.: US 9,794,598 B2
(45) Date of Patent: Oct. 17, 2017

(54) IMAGE PROCESSING APPARATUS FOR RECOGNIZING THAT A MOVING IMAGE IS NOT PROPERLY CODED

(71) Applicant: CANON KABUSHIKI KAISHA, Tokyo (JP)

(72) Inventor: Koji Togita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 14/266,347

(22) Filed: Apr. 30, 2014

(65) Prior Publication Data

US 2014/0328412 A1 Nov. 6, 2014

(30) Foreign Application Priority Data

May 2, 2013 (JP) .................................. 2013-096997
Mar. 3, 2014 (JP) .................................. 2014-040760

(51) Int. Cl.
*H04N 19/85* (2014.01)
*H04N 19/895* (2014.01)
*H04N 19/46* (2014.01)

(52) U.S. Cl.
CPC ........... *H04N 19/895* (2014.11); *H04N 19/46* (2014.11)

(58) Field of Classification Search
CPC ............ G11B 2220/41; G11B 2220/90; G11B 27/002; G11B 27/032; G11B 27/034; G11B 27/10; G11B 27/11; G11B 27/34; H04N 21/235; H04N 21/236; H04N 21/23611; H04N 21/23614; H04N 21/242; H04N 21/4346; H04N 21/4348; H04N 21/435; H04N 21/8455; H04N 21/8547

See application file for complete search history.

(56) References Cited

U.S. PATENT DOCUMENTS

| | | | | |
|---|---|---|---|---|
| 5,596,565 A * | 1/1997 | Yonemitsu | ....... | H04N 21/44020 348/342 |
| 6,381,254 B1 * | 4/2002 | Mori | ................ | H04N 21/23406 370/537 |
| 6,573,819 B1 * | 6/2003 | Oshima | ............ | G11B 20/00007 348/51 |
| 6,738,427 B2 * | 5/2004 | Zetts | ..................... | H04N 21/235 375/240.26 |
| 7,280,738 B2 * | 10/2007 | Kauffman | ............ | G11B 27/034 369/275.1 |
| 2002/0035732 A1 * | 3/2002 | Zetts | ..................... | G11B 27/002 725/148 |
| 2005/0008327 A1 * | 1/2005 | Shinkai | ................ | G11B 27/031 386/283 |

FOREIGN PATENT DOCUMENTS

JP  2003-061041 A  2/2003

* cited by examiner

*Primary Examiner* — Nathnael Aynalem
(74) *Attorney, Agent, or Firm* — Canon USA, Inc. I.P. Division

(57) ABSTRACT

An image processing apparatus includes a coding unit configured to code first moving image data, a generation unit configured to generate second moving image data having a smaller number of pixels than the first moving image data, and an adding unit configured to, in a case where the first moving image data is not properly coded by the coding unit when the second moving image data is generated while the first moving image data is coded, add to the second moving image data predetermined information for identifying that the first moving image data is not properly coded.

19 Claims, 15 Drawing Sheets

FIG.3
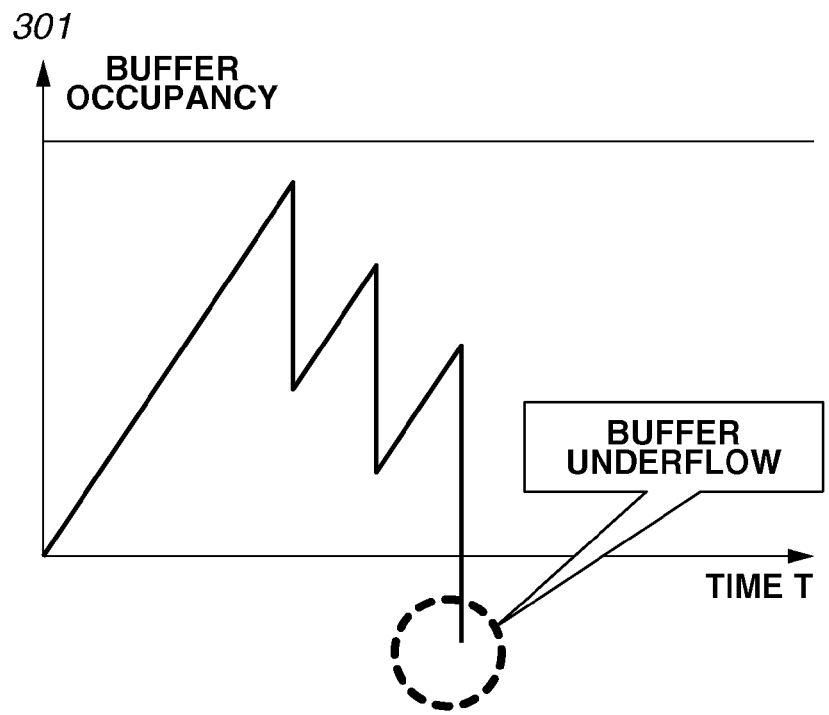
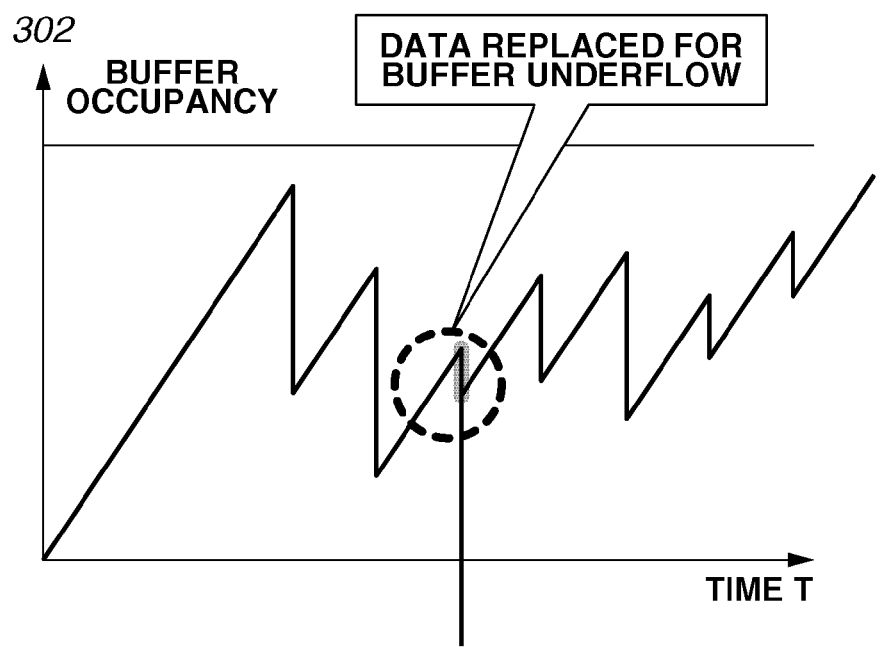

FIG.8

| FRAME NUMBER | INFORMATION |
|---|---|
| ⋮ | ⋮ |
| N-2 | OVERFLOW |
| N-1 | OVERFLOW |
| N | UNDERFLOW |
| N+1 | UNDERFLOW |
| N+2 | UNDERFLOW |
| ⋮ | ⋮ |

IMAGE PROCESSING APPARATUS FOR RECOGNIZING THAT A MOVING IMAGE IS NOT PROPERLY CODED

BACKGROUND OF THE INVENTION

Field of the Invention

The present invention relates to an image processing apparatus and an image processing method, and more particularly to a technique using coding of a moving image.

Description of the Related Art

Conventionally, there has been used a certain technique when editing a moving image, for example, splitting or merging it. In the technique, a moving image for editing (hereinafter referred to as an editing moving image) having a smaller size than the moving image to be edited is prepared, an editing point is determined by using the editing moving image, and then the moving image to be edited is edited based on the editing point (for example, refer to Japanese Patent Application Laid-Open No. 2003-61041). The editing moving image is also referred to as a proxy.

As a method for coding a moving image and compressing the amount of information, the H.264 coding method is known. With such a coding method, it is necessary to set a virtual buffer, and control a code amount so that the occupancy of coded data to be stored in the virtual buffer falls within a predetermined range.

When generating a proxy, an original moving image to be edited is once decoded, processing for reducing the screen size is performed on the moving image, and then compression and coding processing is again performed thereon. Thus, this procedure takes much time for generating a proxy. Accordingly, a method is conceivable, in which an editing moving image having a small number of pixels is generated and recorded while recording a high-definition main moving image.

When simultaneously recording a main moving image and an editing moving image as described above, the main moving image requires a larger data amount and a higher data rate for moving image data to be recorded than the editing moving image does. Therefore, although the virtual buffer of the editing moving image neither overflows nor underflows, the virtual buffer of the main moving image may overflow or underflow.

In this case, the main moving image is not properly coded. Accordingly, processing for replacing a frame in which the virtual buffer has overflowed or underflowed with the previous frame is performed, for example. Therefore, the main moving image may include an image different from that of the editing moving image for the frame in which the virtual buffer has failed.

The moving image data of the main moving image requires a high data rate. Therefore, when the data rate is controlled according to an upper-limit rate for recording or transmission, coding deterioration may be conspicuous in the main moving image although it is not conspicuous in the editing moving image.

In this case, the main moving image is not properly coded, and an image in a frame of the main moving image differs from an image in the corresponding frame of the editing moving image.

As described above, there has conventionally been a problem that, when the main moving image is not properly coded, a user cannot recognize that an image in a frame of the main moving image differs from an image in the corresponding frame of the editing moving image.

SUMMARY OF THE INVENTION

The present invention is directed to an image processing apparatus capable of allowing a user to easily recognize that a main moving image is not properly coded, based on an editing moving image.

According to an aspect of the present invention, an image processing apparatus includes a coding unit configured to code first moving image data, a generation unit configured to generate second moving image data having a smaller number of pixels than the first moving image data, and an adding unit configured to, in a case where the first moving image data is not properly coded by the coding unit when the second moving image data is generated by the generation unit while the first moving image data is coded by the coding unit, add to the second moving image data predetermined information for identifying that the first moving image data is not properly coded.

Further features of the present invention will become apparent from the following description of exemplary embodiments with reference to the attached drawings.

BRIEF DESCRIPTION OF THE DRAWINGS

FIG. 3 illustrates a transition of a virtual buffer according to the first exemplary embodiment.

FIG. 8 illustrates additional information according to the second exemplary embodiment.

DESCRIPTION OF THE EMBODIMENTS

Figure 1:
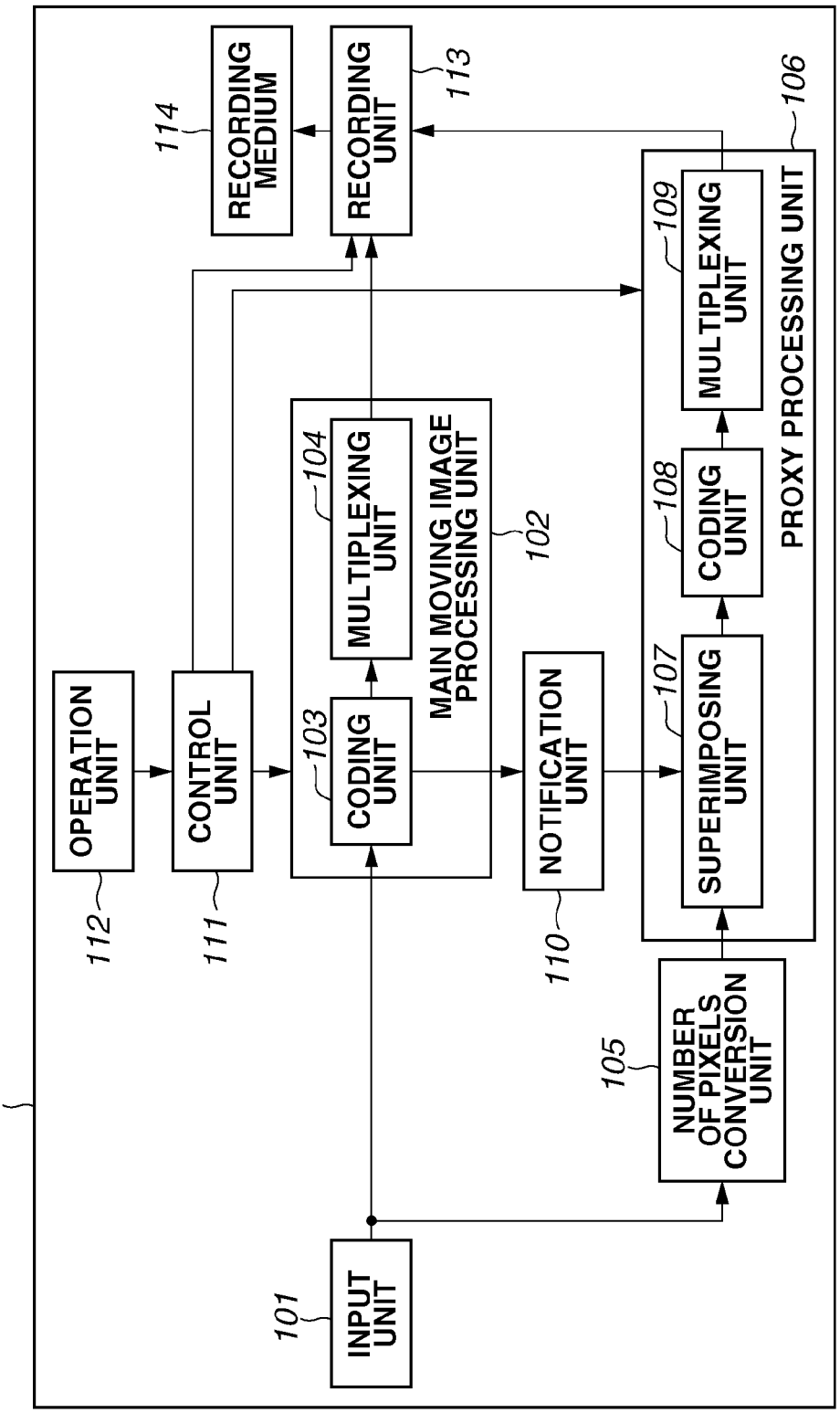
FIG. 1 is a block diagram illustrating a configuration example of an image processing apparatus according to a first exemplary embodiment.

FIG. 1 illustrates a configuration of an image processing apparatus 100 according to a first exemplary embodiment of the present invention.

Referring to FIG. 1, an input unit 101 inputs moving image data. In the present exemplary embodiment, the input unit 101 inputs moving image data corresponding to 60 frames per second, with each frame having 1920 (horizontal)×1080 (vertical) pixels. However, the configuration is not limited thereto, and moving image data having other pixel numbers and frame rates may be input. The input unit 101 may input moving image data from an imaging unit including an optical system, such as an image sensor and a lens.

A main moving image processing unit 102 codes input moving image data, and generates a stream of the coded main moving image data (first moving image data). The main moving image processing unit 102 includes a coding unit 103 and a multiplexing unit 104. The coding unit 103 codes the input moving image data according to the H.264 coding method, for example, which is a predictive coding method using motion compensation.

The coding unit 103 performs orthogonal transform, quantization, and entropy-coding on a prediction error between a coding target image and a reference image. The coding unit 103 codes the moving image data so that the data amount of the coded moving image data does not exceed predetermined upper and lower limits of the virtual buffer, based on the generated code amount. The multiplexing unit 104 adds additional information as required to the coded moving image data to generate moving image data for recording (hereinafter referred to as recording moving image data).

A number of pixels conversion unit 105 reduces the number of pixels for each frame of the moving image data input by the input unit 101 to achieve the number of pixels for the editing moving image data (second moving image data).

Although, in the present exemplary embodiment, the number of pixels conversion unit 105 converts the number of pixels of the input moving image data into 640 (horizontal)×480 (vertical) pixels, the number of pixels conversion unit 105 may converts it into other pixel numbers. The frame rate of the moving image data output from the number of pixels conversion unit 105 is the same as that of the moving image data output from the input unit 101.

A proxy processing unit 106 codes the editing moving image data (hereinafter referred to as proxy data) output from the number of pixels conversion unit 105 to generate a stream of the coded proxy data. The proxy processing unit 106 includes a superimposing unit 107, a coding unit 108, and a multiplexing unit 109.

In a case where the main moving image data is not properly coded, as described below, the superimposing unit 107 superimposes on the corresponding frame of the input moving image data a predetermined image for notification indicating that the main moving image is not properly coded.

The coding unit 108 is provided as a second coding unit for coding the moving image data output from the superimposing unit 107 according to the H.264 coding method, similar to the coding unit 103. The coding unit 108 codes the moving image data so that the data amount of the coded moving image data does not exceed the predetermined upper and lower limits of the virtual buffer.

The multiplexing unit 109 adds additional information required for the coded moving image data to generate recording moving image data. Thus, in the present exemplary embodiment, the proxy data has a smaller number of pixels than the main moving image data has, and the coded proxy data has a lower data rate than the main moving image data has.

In a case where the coding unit 103 has not been able to properly code the main moving image, a notification unit 110 notifies the superimposing unit 107 of the relevant information together with information about the corresponding frame number.

A control unit 111 includes a central processing unit (CPU), and controls each unit according to instructions from an operation unit 112. The operation unit 112 includes various switches. A user operates the operation unit 112 to instruct to start and stop recording the main moving image, or to specify whether the proxy data is to be recorded.

A recording unit 113 records on a recording medium 114 the main moving image data from the main moving image processing unit 102, and the proxy data from the proxy processing unit 106. The recording unit 113 records the main moving image data and the proxy data as different files according to the file systems such as a file allocation table (FAT). The recording medium 114 is a random access recording medium such as a memory card. The recording medium 114 includes an attaching and detaching mechanism (not illustrated) so that it can be easily attached or detached to or from the image processing apparatus 100.

Recording of the main moving image and the proxy data will be described below.

The user can set whether the proxy data is to be generated in parallel with the main moving image data, and set whether the proxy data is to be recorded on the recording medium 114 by operating the operation unit 112. In a case where recording of the proxy data is not set by the user, the control unit 111 instructs the proxy processing unit 106 not to generate proxy data, and instructs the recording unit 113 to record the main moving image data. In a case where recording of proxy data is set by the user, the control unit 111 instructs the proxy processing unit 106 to generate proxy data, and instructs the recording unit 113 to record the proxy data.

A case where recording of the proxy data is set will be described below.

Upon reception of a recording start instruction from the user, the control unit 111 instructs the main moving image processing unit 102 and the proxy processing unit 106 to start coding processing. Each of the main moving image processing unit 102 and the proxy processing unit 106 starts coding of the moving image data as described above. In the present exemplary embodiment, the control unit 111 sets upper and lower limits of the data rate of the main moving image data so as to be higher than upper and lower limits of the data rate of the proxy data, respectively. The upper and lower limits of the data rate of the main moving image data, and the upper and lower limits of the data rate of the proxy data are set to predetermined values.

At this time, depending on the state of the input moving image data, the virtual buffer (Video Buffering Verifier (VBV) buffer) of the main moving image data coded by the coding unit 103 may overflow or underflow. For example, in a case where the input unit 101 inputs the moving image data from an imaging apparatus, if the imaging apparatus is largely moved, the motion of the input moving image between frames increases. Further, if such a large motion of the moving image between frames continues for a long period of time, the code amount generated after coding increases, possibly resulting in a virtual buffer failure. Thus, if the virtual buffer has failed and hence the main moving image data is not properly coded, the notification unit 110 notifies the superimposing unit 107 of information indicating that the main moving image is not properly coded and information about the frame number for identifying the relevant frame. The multiplexing unit 104 replaces the image of the failed frame with another image having less code amount generated.

FIG. 3 illustrates a transition of the virtual buffer. Failure avoidance processing for the virtual buffer performed by the coding unit 103 and the multiplexing unit 104 will be described below with reference to FIG. 3. Referring to FIG. 3, a transition diagram 301 illustrates a transition of the virtual buffer before the failure avoidance processing is performed, and a transition diagram 302 illustrates a transition of the virtual buffer after the failure avoidance processing is performed.

When coded data is input at a fixed bit rate and, when the decoding time for each frame comes, the code amount of the relevant frames is output from the virtual buffer. A coded stream which has an occupancy of the virtual buffer changing within the predetermined size of the virtual buffer can be reproduced by an ordinary reproducing apparatus which satisfies relevant standards.

In a case where data is input to the virtual buffer at a fixed bit rate, but a large code amount is generated for each frame, the occupancy of the virtual buffer decreases and accordingly the virtual buffer underflows as illustrated in the transition diagram 301. In such a case, the coding unit 103 changes data having a large code amount to data having a small code amount, such as data coded from a single image having a small code amount or data coded through inter-frame prediction using motion vector information indicating no motion, thereby adjusting the occupancy of the virtual buffer as illustrated in the transition diagram 302. This adjustment processing prevents the virtual buffer underflow, which is a state where the data amount is smaller than a predetermined size. Each of the coding units 103 and 108 performs the above-described processing for adjusting the code amount.

When the superimposing unit 107 receives a virtual buffer failure notification and information about the corresponding frame number from the notification unit 110, the superimposing unit 107 adds predetermined notification information to the image data of the frame number notified from the notification unit 110, in the moving image data from the number of pixels conversion unit 105.

Figure 2:
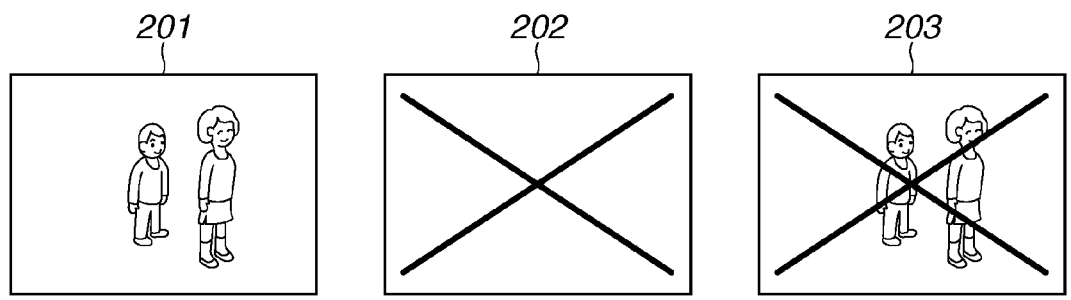
FIG. 2 illustrates image information to be superimposed on moving image data for editing (hereinafter referred to as editing moving image data) according to the first exemplary embodiment.

FIG. 2 illustrates information superimposed by the superimposing unit 107. Referring to FIG. 2, an image 201 is an image of the frame number notified from the notification unit 110 among moving images output from the number of pixels conversion unit 105. Image information 202 is image information superimposed on the image 201 by the superimposing unit 107, and an image 203 is an image output from the superimposing unit 107.

As described above, the main moving image data and the proxy data are generated and recorded on the recording medium 114 as different moving image files until the control unit 111 receives a recording stop instruction from the user. Upon reception of the recording stop instruction from the user, the control unit 111 instructs the main moving image processing unit 102 and the proxy processing unit 106 to stop coding, and instructs the recording unit 113 to stop recording the main moving image data and the proxy data.

Figure 4:
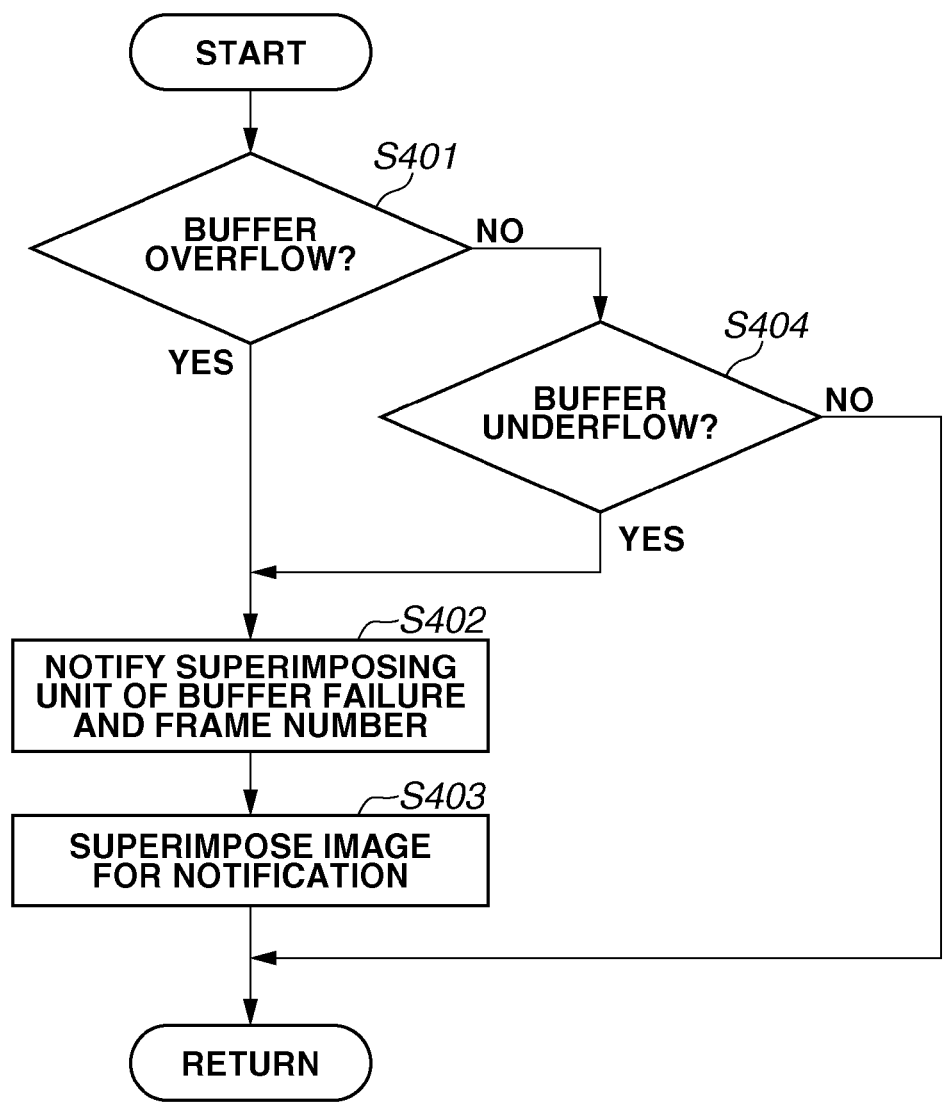
FIG. 4 is a flowchart illustrating an example of processing for buffer failure notification according to the first exemplary embodiment.

FIG. 4 is a flowchart illustrating processing for buffer failure notification during recording of the main moving image data and the proxy data. Processing in this flowchart is implemented when the CPU loads a relevant program stored in a nonvolatile memory provided in the control unit 111 into a volatile memory which functions as a work memory, and then controls each unit to execute the program.

In step S401, while the main moving image data and the proxy data are simultaneously recorded as described above, the notification unit 110 determines whether the virtual buffer of the coding unit 103 overflows. If the virtual buffer overflows (YES in step S401), then in step S402, the notification unit 110 notifies the superimposing unit 107 of information about the buffer failure and information about the corresponding frame number. In step S403, upon reception of the buffer failure notification, the superimposing unit 107 superimposes predetermined information for notification on the image of the corresponding frame number among the moving image data from the number of pixels conversion unit 105, as described above.

If, on the other hand, the virtual buffer does not overflow (NO in step S401), then in step S404, the notification unit 110 determines whether the virtual buffer of the coding unit 103 underflows. If the virtual buffer underflows (YES in step S404), then in step S402, the notification unit 110 notifies the superimposing unit 107 of information about the buffer failure and information about the corresponding frame number.

In step S403, upon reception of the buffer failure notification, the superimposing unit 107 superimposes the predetermined information for notification on the image of the corresponding frame number among the moving image data from the number of pixels conversion unit 105, as described above. If, on the other hand, the virtual buffer does not underflow (NO in step S404), the notification unit 110 does not notify the superimposing unit 107 of information about the buffer failure.

Figure 5:
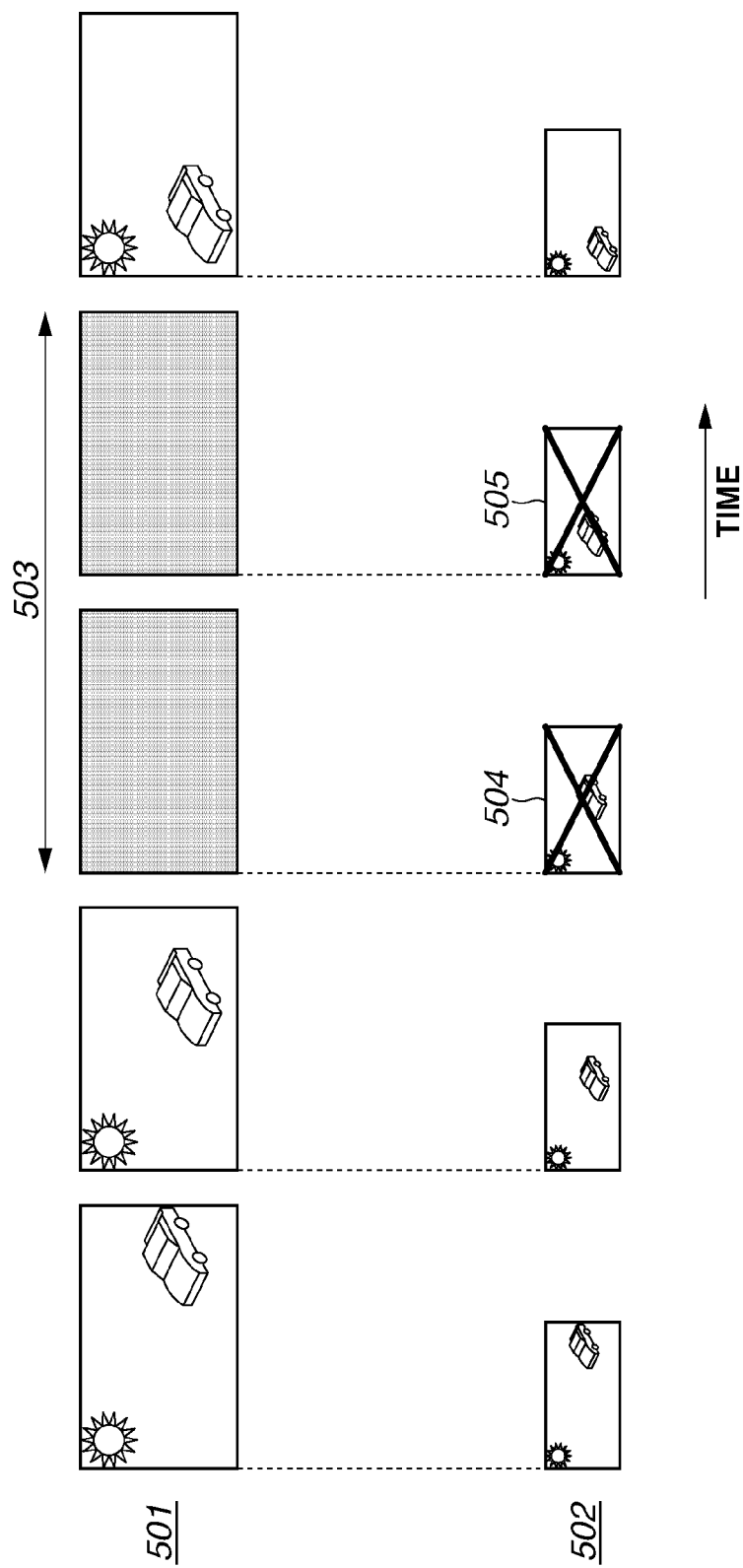
FIG. 5 illustrates a main moving image and an editing moving image being recorded simultaneously.

FIG. 5 illustrates a main moving image and an editing moving image being recorded simultaneously. In a main moving image 501, the virtual buffer has failed and hence the main moving image data is not properly coded in frames during a period 503. Therefore, in an editing moving image 502, images for notification are multiplexed on the images of frames 504 and 505 corresponding to the period 503.

As described above, in the present exemplary embodiment, if the main moving image being recorded simultaneously with the editing moving image is not properly coded, the predetermined image for notification is multiplexed on the corresponding frame in the editing moving image. Therefore, when the editing moving image data is reproduced and decoded, the user can easily recognize frames in which the corresponding main moving images are not properly coded.

In the present exemplary embodiment, the proxy data has a smaller number of pixels for one screen than the main moving image has. In addition to this case, the present invention can also be similarly applied to a case where the proxy data has at least one of a smaller number of pixels, a lower frame rate, and a lower post-coding data rate than the main moving image has. This means that the present invention can also be applied to a case where the proxy data has a smaller data amount per unit time than the main moving image has.

A second exemplary embodiment will be described below.

Figure 6:
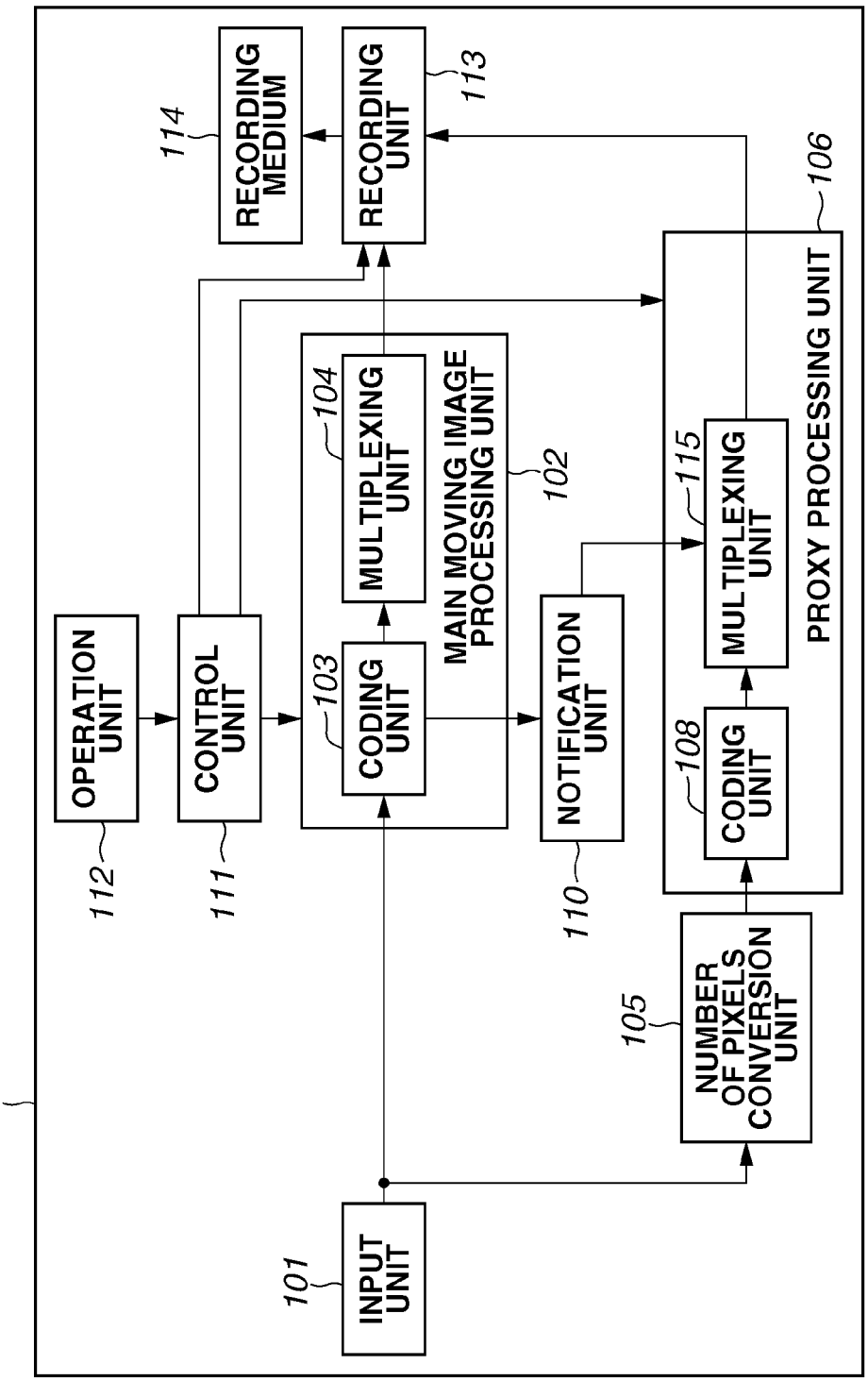
FIG. 6 is a block diagram illustrating a configuration example of an image processing apparatus according to a second exemplary embodiment.

FIG. 6 illustrates a configuration of an image processing apparatus 100 according to the second exemplary embodiment. Referring to FIG. 6, elements similar to those in FIG. 1 are assigned the same reference numerals. In the present exemplary embodiment, if the notification unit 110 detects a failure of the virtual buffer of the coding unit 103, the notification unit 110 notifies a multiplexing unit 115 included in the proxy processing unit 106 of the virtual buffer overflow or underflow and the corresponding frame number. Other configurations and operations are similar to those according to the first exemplary embodiment.

Figure 7:
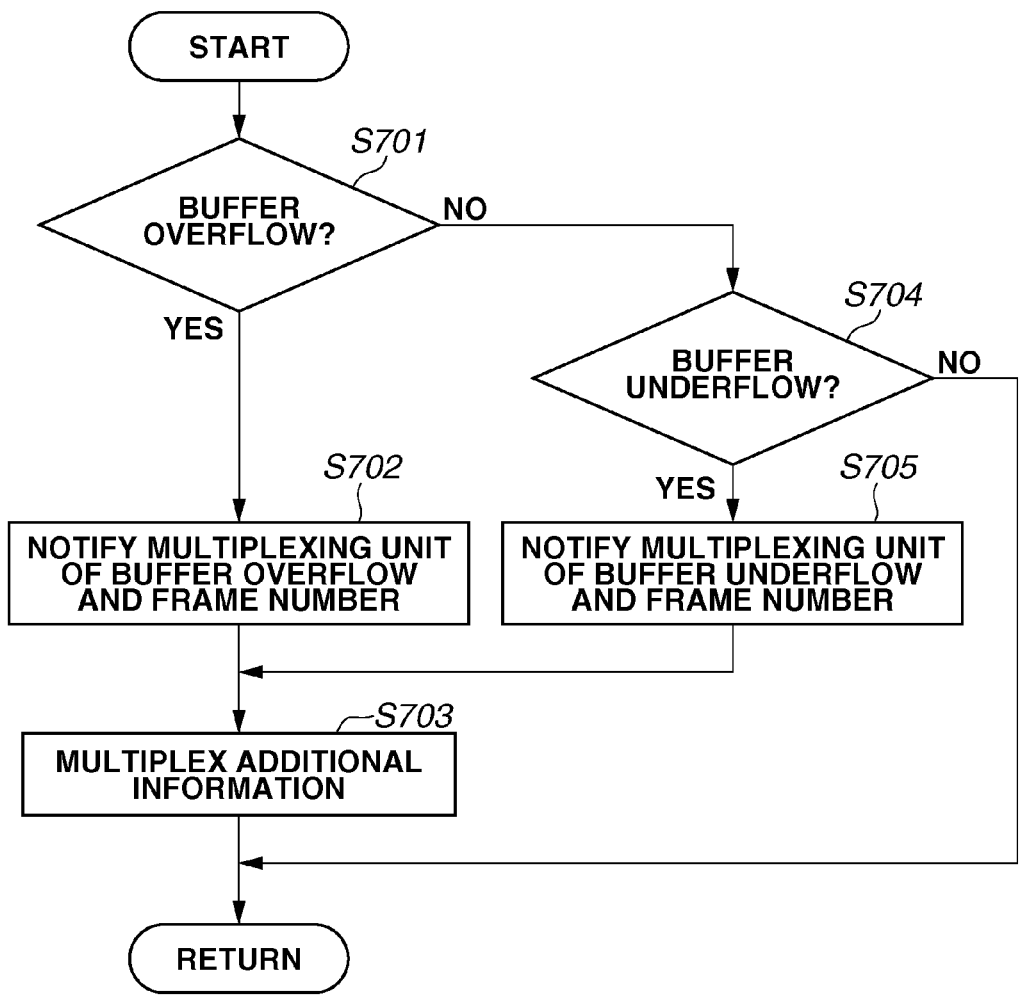
FIG. 7 is a flowchart illustrating an example of processing for buffer failure notification according to the second exemplary embodiment.

FIG. 7 is a flowchart illustrating processing for buffer failure notification during recording of the main moving image and the proxy data. Processing in this flowchart is implemented when the CPU loads a relevant program stored in the nonvolatile memory provided in the control unit 111 into the volatile memory which functions as a work memory, and then executes it. In step S701, while the main moving image data and the proxy data is simultaneously recorded, the notification unit 110 determines whether the virtual buffer of the coding unit 103 overflows.

If the virtual buffer overflows (YES in step S701), then in step S702, the notification unit 110 notifies the multiplexing unit 115 of the virtual buffer overflow and information about the corresponding frame number. In step S703, upon reception of the overflow notification, the multiplexing unit 115 multiplexes additional information indicating the overflow on the frame having the corresponding frame number among the moving image data coded by the coding unit 108.

If, on the other hand, the virtual buffer does not overflow (NO in step S701), then in step S704, the notification unit 110 determines whether the virtual buffer of the coding unit 103 underflows. If the virtual buffer underflows (YES in step S704), then in step S705, the notification unit 110 notifies the multiplexing unit 115 of the virtual buffer underflow and information about the corresponding frame number.

In step S703, upon reception of the underflow notification, the multiplexing unit 115 multiplexes additional information indicating the underflow on the frame having the corresponding frame number among the moving image data coded by the coding unit 108. If, on the other hand, the virtual buffer does not underflow (NO in step S704), the notification unit 110 does not notify the multiplexing unit 115 of information about the buffer failure.

FIG. 8 illustrates additional information to be multiplexed on the proxy data by the multiplexing unit 115. As illustrated in FIG. 8, based on the relevant notification from the notification unit 110, the additional information indicating the overflow or underflow is added to the corresponding frame.

Figure 9:
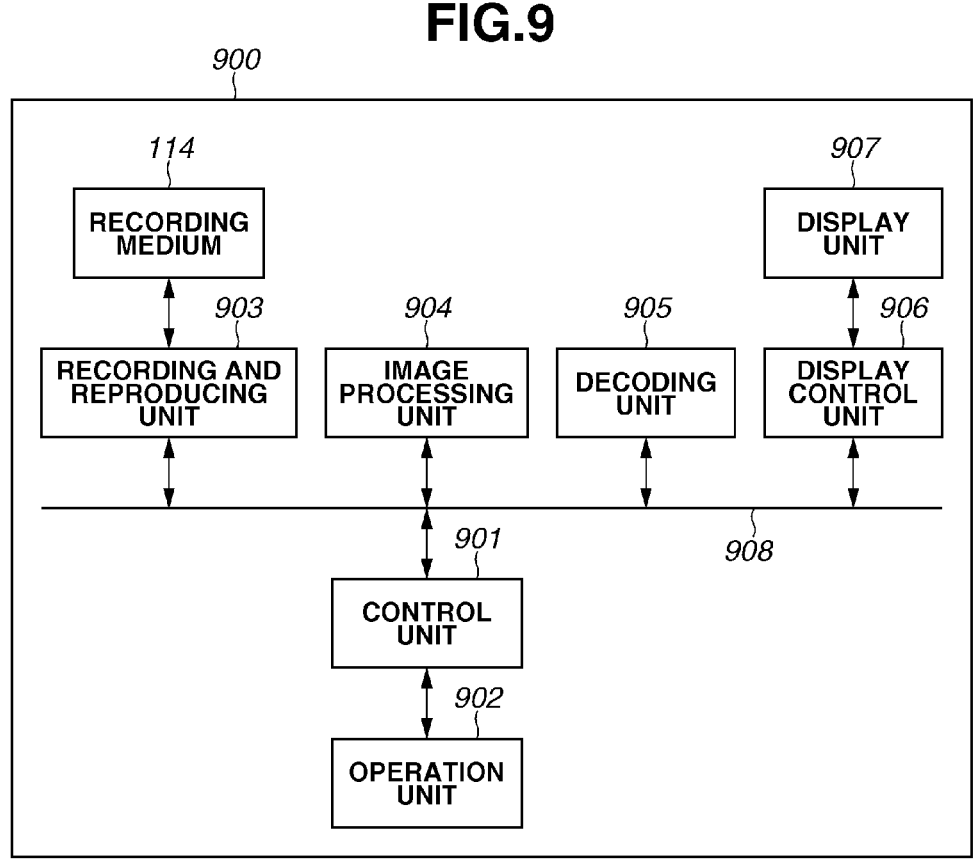
FIG. 9 is a block diagram illustrating an exemplary configuration of a reproducing apparatus according to the second exemplary embodiment.

FIG. 9 is a block diagram illustrating a configuration example of a reproducing apparatus 900 having functions of reproducing and editing the main moving image data and the proxy data recorded as described above. Referring to FIG. 9, a control unit 901 includes a CPU, and controls each unit according to instructions from an operation unit 902. A recording and reproducing unit 903 reproduces the main moving image data and the proxy data recorded on the recording medium 114. Furthermore, the recording and reproducing unit 903 records various types of information such as editing information according to instructions from the control unit 901.

An image processing unit 904 performs processing for changing, among the reproduced proxy data, the image of a frame corresponding to a failed frame in the main moving image to a predetermined image for notification to display the resultant image. A decoding unit 905 decodes the main moving image data and the proxy data reproduced by the recording and reproducing unit 903. A display control unit 906 displays decoded moving images and various types of information on a display unit 907. A bus 908 transmits and receives data between the above-described units.

Processing performed when the user edits data by using the proxy data will be described below. When the user operates the operation unit 902 to issue an instruction for reproducing the proxy data, the control unit 901 instructs the recording and reproducing unit 903 to reproduce the proxy data.

The recording and reproducing unit 903 reproduces the proxy data from the recording medium 114, and transmits the proxy data to the decoding unit 905. The decoding unit 905 decodes the reproduced proxy data, and transmits the decoded proxy data to the image processing unit 904. At this time, the decoding unit 905 determines whether additional information indicating overflow or underflow is added to each frame in the proxy data. If additional information is added to a frame in the proxy data, the decoding unit 905 notifies the image processing unit 904 of the frame number corresponding to the additional information indicating overflow or underflow.

The image processing unit 904 changes the number of pixels of each frame in the decoded proxy data to the number suitable for display on the display unit 907, and outputs the result to the display control unit 906. Upon reception of the information about the frame number corresponding to the additional information indicating overflow or underflow from the decoding unit 905, the image processing unit 904 changes the image of the notified frame number to a predetermined image (a gray image in this case), and outputs the changed image to the display control unit 906.

The frame of the proxy data corresponding to a frame in the main moving image of the virtual buffer overflow or underflow is changed to a predetermined image, and the changed image is displayed, as described above. Thus, the editing moving image allows the user to easily recognize that the main moving image is not properly coded.

While checking the editing moving image displayed on the display unit 907 as described above, the user operates the operation unit 902 to specify, for example, an in-point and an out-point. The control unit 901 generates information about the frame numbers of the in-point and out-point specified by the user, and causes the recording and reproducing unit 903 to record the information on the recording medium 114.

As described above, in the present exemplary embodiment, if the main moving image being recorded simultaneously with the editing moving image is not properly coded, the multiplexing unit 115 multiplexes additional information on the corresponding frame in the editing moving image. Therefore, when the editing moving image data is reproduced and decoded, the user can easily recognize a frame in which the corresponding main moving image is not properly coded.

Although, in the second exemplary embodiment, the reproducing apparatus 900 is configured as a different apparatus from the image processing apparatus 100, the image processing apparatus 100 may include the configuration of the reproducing apparatus 900.

A third exemplary embodiment will be described below.

Figure 10:
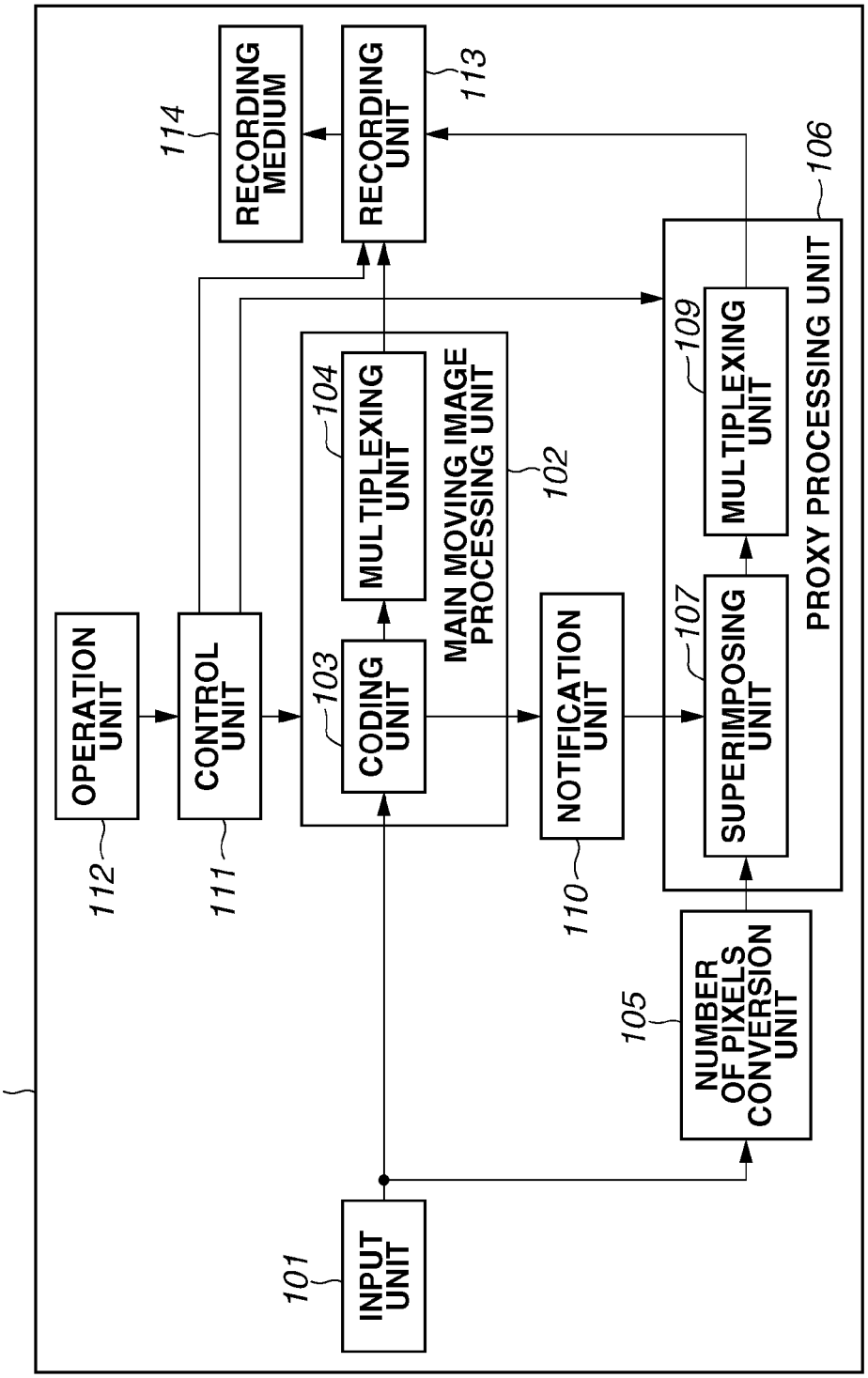
FIG. 10 is a block diagram illustrating a configuration example of an image processing apparatus according to a third exemplary embodiment.

FIG. 10 is a block diagram illustrating a configuration example of an image processing apparatus 100 according to the third exemplary embodiment. In the present exemplary embodiment, the proxy data is recorded without being coded. Therefore, the image processing apparatus 100 illustrated in FIG. 10 does not include the coding unit 108 illustrated in FIG. 1. Other configurations are similar to those according to the first exemplary embodiment.

Specifically, if the superimposing unit 107 receives a virtual buffer failure notification and information about the corresponding frame number from the notification unit 110, the superimposing unit 107 adds predetermined notification information to the image of the frame number notified from the notification unit 110 in the moving image data from the number of pixels conversion unit 105. If, on the other hand, the superimposing unit 107 does not receive a virtual buffer failure notification from the notification unit 110, the superimposing unit 107 outputs the moving image data from the number of pixels conversion unit 105 as it is to the multiplexing unit 109. The multiplexing unit 109 adds required information to the moving image data from the superimposing unit 107 to generate the recording moving image data.

Figure 11:
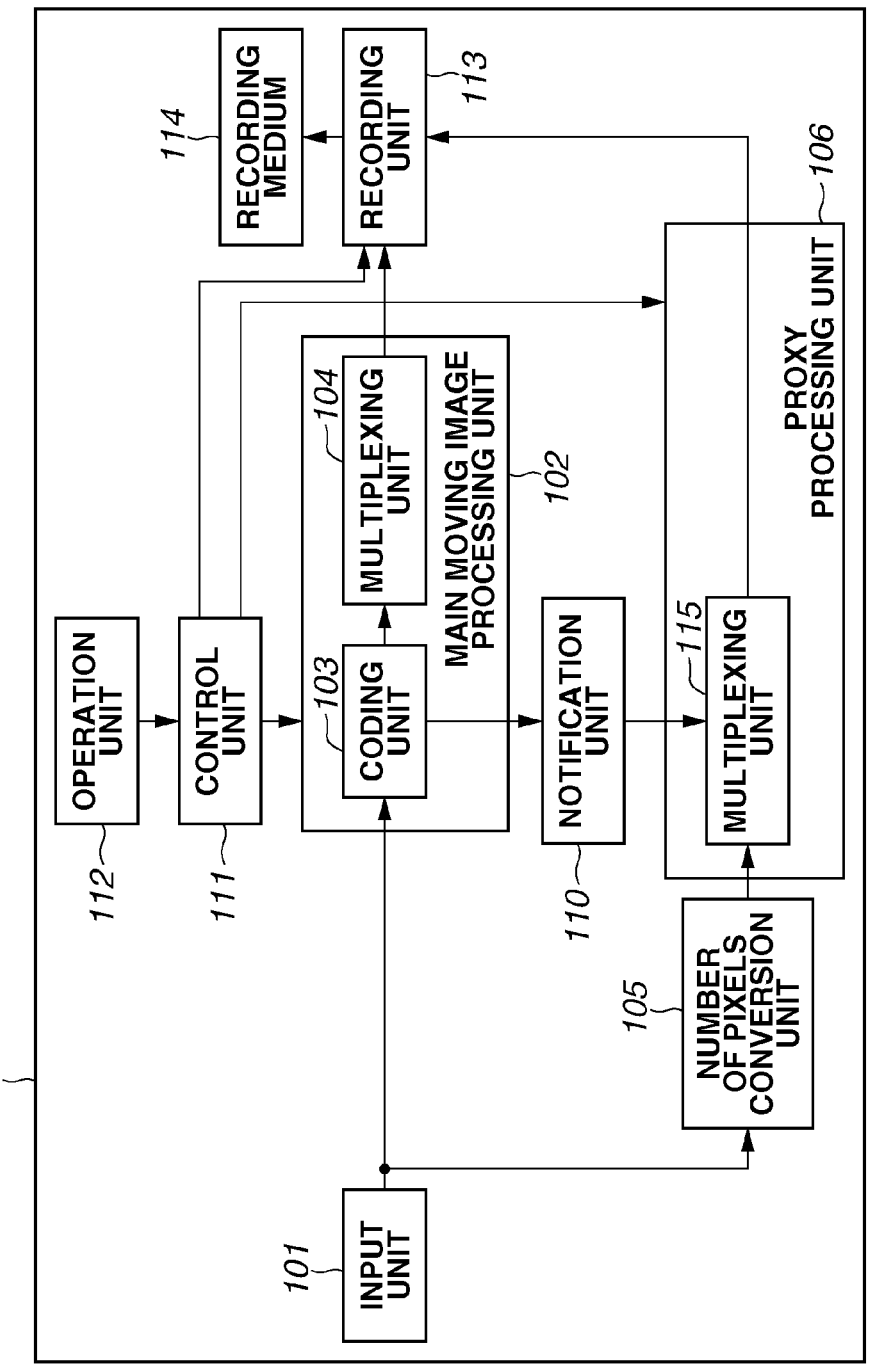
FIG. 11 is a block diagram illustrating a configuration example of an image processing apparatus according to a fourth exemplary embodiment.

A fourth exemplary embodiment will be described below. FIG. 11 is a block diagram illustrating a configuration example of an image processing apparatus 100 according to the fourth exemplary embodiment. In the present exemplary embodiment, the proxy data is recorded without being coded. Therefore, the image processing apparatus 100 illustrated in FIG. 11 does not include the coding unit 108 illustrated in FIG. 6. Other configurations are similar to those according to the second exemplary embodiment.

Specifically, upon reception of the overflow or underflow notification from the notification unit 110, the multiplexing unit 115 multiplexes additional information indicating the overflow or underflow on the frame having the corresponding frame number among the moving image data from the number of pixels conversion unit 105.

A fifth exemplary embodiment will be described below. In the first to fourth exemplary embodiments, if a buffer overflow or buffer underflow is detected during coding of the main moving image data, an image for notification or additional information is added to the proxy data. In the present exemplary embodiment, the degree of deterioration (deterioration level) of the main moving image data due to coding is detected, and an image for notification is multiplexed on the proxy data according to the detected deterioration level.

Figure 12:
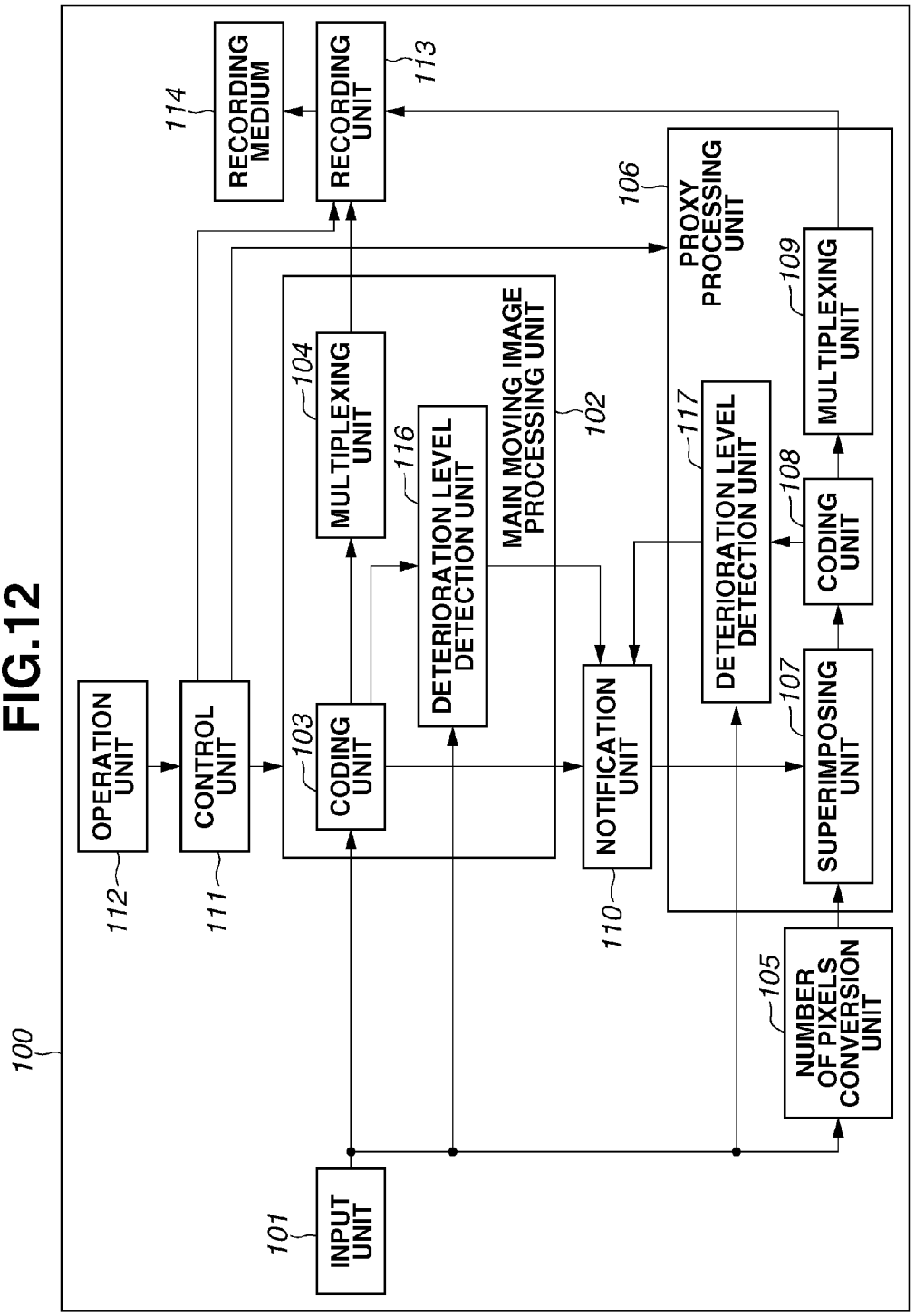
FIG. 12 is a block diagram illustrating a configuration example of an image processing apparatus according to a fifth exemplary embodiment.

FIG. 12 is a block diagram illustrating a configuration example of an image processing apparatus 100 according to the fifth exemplary embodiment. Referring to FIG. 12, elements similar to those in FIG. 1 are assigned the same reference numerals. The image processing apparatus 100 illustrated in FIG. 12 has a similar basic configuration to that illustrated in FIG. 1 except that deterioration level detection units 116 and 117 are provided.

Referring to FIG. 12, the deterioration level detection unit 116 detects the deterioration level due to the coding processing for each frame of the main moving image data, and outputs information related to the detected deterioration level to the notification unit 110. The deterioration level detection unit 117 detects the deterioration level due to the coding processing for each frame of the proxy data, and outputs information related to the detected deterioration level to the notification unit 110.

In addition to information about the buffer overflow or buffer underflow from the coding unit 103, the notification unit 110 receives coding deterioration level information from the deterioration level detection units 116 and 117. Based on these pieces of information, the notification unit 110 detects that the main moving image is not properly coded or that the image quality of the main moving image is deteriorated, and notifies the superimposing unit 107 of the relevant information together with information about the corresponding frame number. Other configurations and operations are similar to those according to the first exemplary embodiment.

Processing performed by the deterioration level detection units 116 and 117 will be described below. In quantization processing performed by the coding unit 103, quantization noise occurs in the main moving image. Based on the moving image data input from the input unit 101 and locally decoded data obtained by decoding the moving image data coded by the coding unit 103, the deterioration level detection unit 116 calculates the Peak Signal to Noise Ratio (PSNR), one of image quality indices, by using a well-known method, and outputs the result of the calculation to the notification unit 110. The PSNR is information for objectively evaluating the signal deterioration due to the conversion processing such as compression. Generally, the smaller the PSNR is, the less the expected image quality deterioration due to coding is.

The deterioration level detection unit 116 further detects blocks with block noise occurrence in the coded main moving image. Block noise refers to noise occurring in a state where there is no correlation between quantization-unit blocks because of a quantization error of low-frequency components. Then, the deterioration level detection unit 116 outputs to the notification unit 110 information indicating the ratio (number) of blocks determined to have block noise out of blocks in one screen.

Specifically, the deterioration level detection unit 116 detects that block noise has occurred for each block by using the variance value of target blocks and a quantization value setting for the main moving image output from the coding unit 103. More specifically, by utilizing the characteristics that level differences of low-frequency components are recognized as noise at block boundaries in a flat portion having a low variance value, the deterioration level detection unit 116 detects that block noise has occurred in a case where the variance value is smaller than a predetermined variance value and the quantization value is larger than a predetermined quantization value for each block of the main moving image output from the coding unit 103.

The deterioration level detection unit 116 further detects blocks with mosquito noise occurrence in the coded main moving image. Mosquito noise refers to ringing noise occurring around edges because of a quantization error of high-frequency components. The deterioration level detection unit 116 outputs to the notification unit 110 information indicating the ratio (number) of blocks determined to have mosquito noise out of blocks in one screen.

There is a characteristic that mosquito noise is conspicuous when a large variation of the moving image signal exists in low-frequency components and small noise is added in high-frequency components. Therefore, the deterioration level detection unit 116 detects that mosquito noise has occurred by using high-frequency components before and after quantization of target blocks and the variance value of the target blocks for the main moving image from the coding unit 103. Specifically, the deterioration level detection unit 116 detects that mosquito noise has occurred in a case where edges are included in blocks and high-frequency components of target blocks largely differ before and after quantization.

Based on the input moving image data and locally decoded image data obtained by decoding the proxy data coded by the coding unit 108, the deterioration level detection unit 117 detects the PSNR, similar to the deterioration level detection unit 116. However, since the proxy data has a smaller number of pixels than the input moving image data does, due to the conversion performed by the number of pixels conversion unit 105, the deterioration level detection unit 117 converts the number of pixels in the locally decoded proxy data into the same number of pixels as that in the input moving image data, before detecting the PSNR. The deterioration level detection unit 117 outputs the PSNR value for each frame to the notification unit 110.

Figure 13:
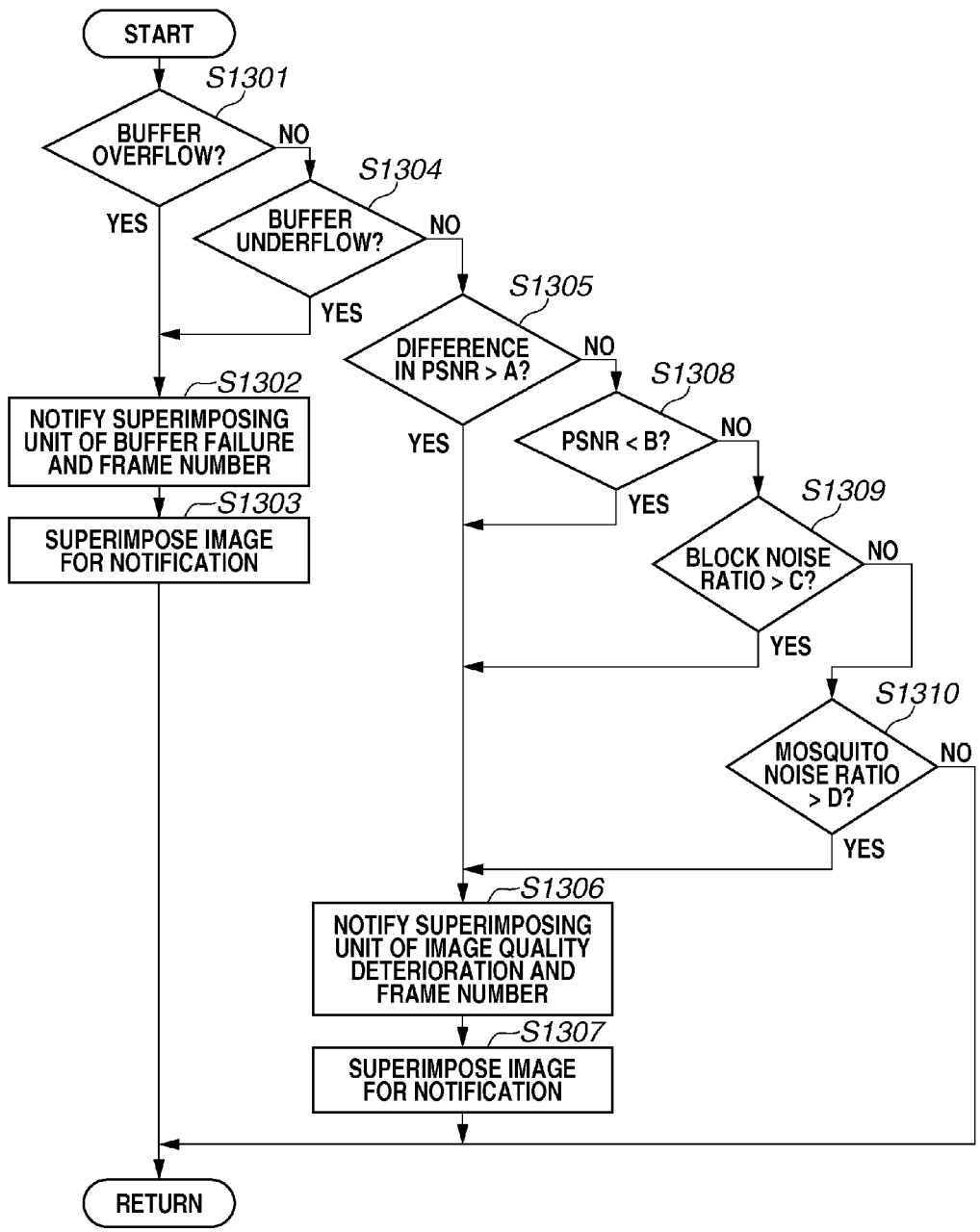
FIG. 13 is a flowchart illustrating an example of processing for image quality deterioration notification according to the fifth exemplary embodiment.

FIG. 13 is a flowchart illustrating processing for image quality deterioration notification during recording of the main moving image and the proxy data. Processing in this flowchart is implemented when the CPU loads a relevant program stored in the nonvolatile memory provided in the control unit 111 into the volatile memory which functions as a work memory, and then executes it.

In step S1301, while the main moving image data and the proxy data are simultaneously recorded as described above, the notification unit 110 determines whether the virtual buffer of the coding unit 103 overflows. If the virtual buffer overflows (YES in step S1301), then in step S1302, the notification unit 110 notifies the superimposing unit 107 of information about the buffer failure and information about the corresponding frame number. In step S1303, upon reception of the buffer failure notification, the superimposing unit 107 superimposes predetermined information for notifying the buffer failure occurrence in the main moving image on the image of the corresponding frame number among the moving image data from the number of pixels conversion unit 105.

If, on the other hand, the virtual buffer does not overflow (NO in step S1301), then in step S1304, the notification unit 110 determines whether the virtual buffer of the coding unit 103 underflows. If the virtual buffer underflows (YES in step S1304), then in step S1302, the notification unit 110 notifies the superimposing unit 107 of information about the buffer failure and information about the corresponding frame number. In step S1303, upon reception of the buffer failure notification, the superimposing unit 107 superimposes predetermined information for notifying the buffer failure occurrence in the main moving image on the image of the corresponding frame number among the moving image data from the number of pixels conversion unit 105.

If, on the other hand, the virtual buffer does not overflow (NO in step S1304), then in step S1305, the notification unit 110 determines whether the difference between the PSNR notified from the deterioration level detection unit 116 and the PSNR notified from the deterioration level detection unit 117 is larger than a predetermined value A. If the difference between the two PSNRs is larger than the predetermined value A (YES in step S1305), then in step S1306, the notification unit 110 notifies the superimposing unit 107 of information about the image quality deterioration of the main moving image and information about the corresponding frame number. In step S1307, upon reception of the image quality deterioration notification, the superimposing unit 107 superimposes predetermined information for notifying the image quality deterioration on the image of the corresponding frame number among the moving image data from the number of pixels conversion unit 105.

If, on the other hand, the difference between the two PSNRs is equal to or smaller than the predetermined value A (NO in step S1305), then in step S1308, the notification unit 110 determines whether the PSNR notified from the deterioration level detection unit 116 is smaller than a predetermined value B. If the PSNR is smaller than the predetermined value B (YES in step S1308), then in step S1306, the notification unit 110 notifies the superimposing unit 107 of information about the image quality deterioration of the main moving image and information about the corresponding frame number. In step S1307, upon reception of the image quality deterioration notification, the superimposing unit 107 superimposes predetermined information for notifying the image quality deterioration on the image of the corresponding frame number among the moving image data from the number of pixels conversion unit 105.

If, on the other hand, the PSNR is equal to or larger than the predetermined value B (NO in step S1308), then in step S1309, the notification unit 110 determines whether the block noise ratio (ratio of blocks with block noise occurrence) notified from the deterioration level detection unit 116 is larger than a predetermined value C. If the block noise ratio is larger than the predetermined value C (YES in step S1309), then in step S1306, the notification unit 110 notifies the superimposing unit 107 of information about the image quality deterioration of the main moving image and information about the corresponding frame number. In step S1307, upon reception of the image quality deterioration notification, the superimposing unit 107 superimposes predetermined information for notifying the image quality deterioration on the image of the corresponding frame number among the moving image data from the number of pixels conversion unit 105.

If, on the other hand, the block noise ratio is equal to or smaller than the predetermined value C (NO in step S1309), then in step S1310, the notification unit 110 determines whether the mosquito noise ratio (ratio of blocks with mosquito noise occurrence) notified from the deterioration level detection unit 116 is larger than a predetermined value D. If the mosquito noise ratio is larger than the predetermined value D (YES in step S1310), then in step S1306, the notification unit 110 notifies the superimposing unit 107 of information about the image quality deterioration of the main moving image and information about the corresponding frame number. In step S1307, upon reception of the image quality deterioration notification, the superimposing unit 107 superimposes predetermined information for notifying the image quality deterioration on the image of the corresponding frame number among the moving image data from the number of pixels conversion unit 105.

As described above, in the present exemplary embodiment, image quality deterioration of the main moving image due to coding is detected in addition to the buffer failure during coding of the main moving image, and the relevant information is superimposed on the proxy data. Therefore, the editing moving image allows the user to easily and appropriately recognize that the main moving image is not properly coded and that the image quality is deteriorated.

Although, in the present exemplary embodiment, different additional information is added to the proxy data in the case of buffer failure from that added in the case of image quality deterioration due to coding, the same information may be superimposed. In other words, both in the case of buffer failure and the case of image quality deterioration due to coding, it may be determined that the moving image data is not properly coded, and record relevant additional information.

Figure 14:
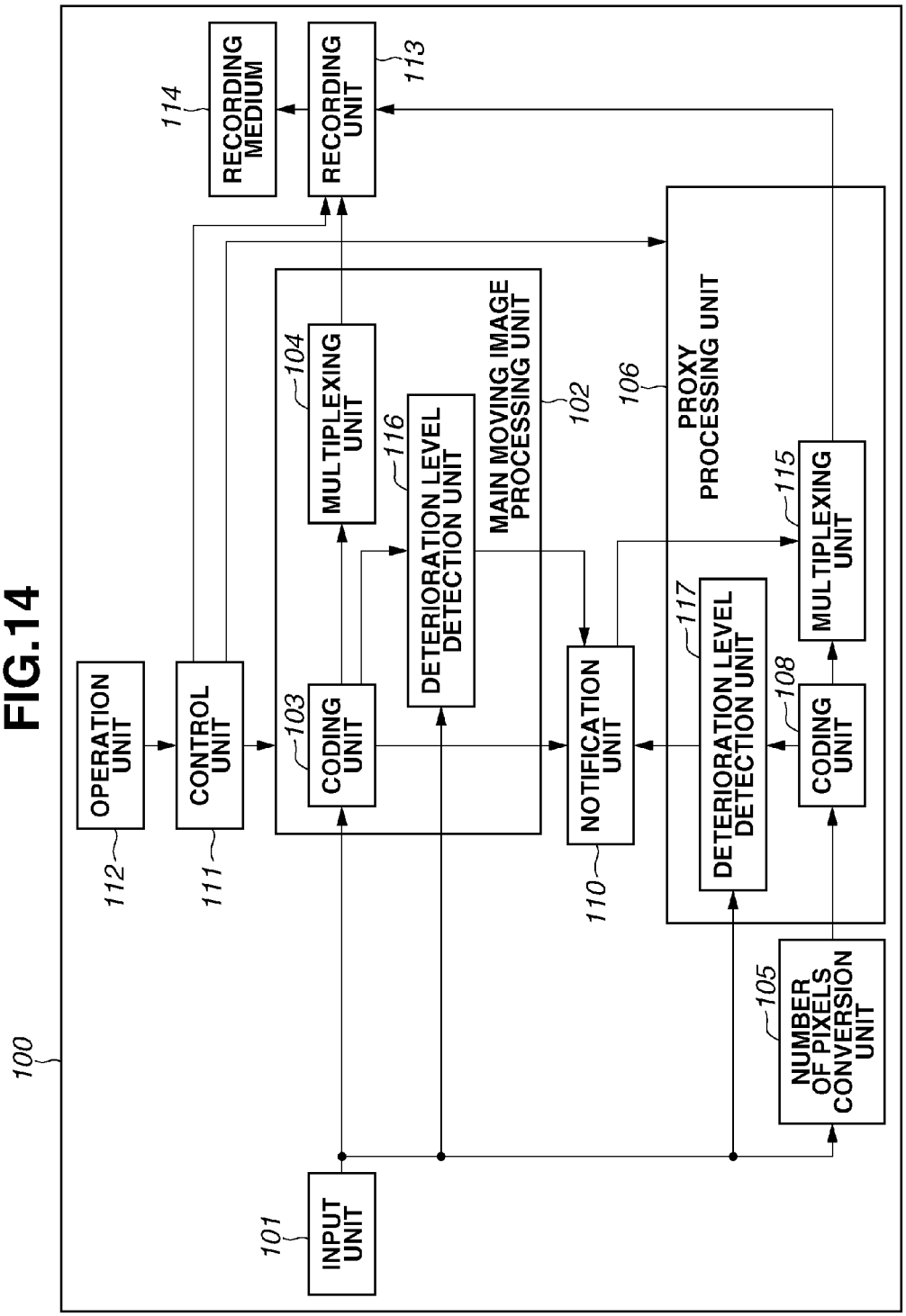
FIG. 14 is a block diagram illustrating a configuration example of an image processing apparatus according to a sixth exemplary embodiment.

A sixth exemplary embodiment will be described below. FIG. 14 is a block diagram illustrating a configuration example of an image processing apparatus 100 according to the sixth exemplary embodiment. Referring to FIG. 14, elements similar to those in FIGS. 6 and 12 are assigned the same reference numerals. The image processing apparatus 100 illustrated in FIG. 14 has a similar basic configuration to that illustrated in FIG. 6 except that the deterioration level detection units 116 and 117 are provided. Referring to FIG. 14, similar to FIG. 12, the deterioration level detection unit 116 detects the deterioration level due to the coding processing for each frame of the main moving image data, and outputs information related to the detected deterioration level to the notification unit 110. The deterioration level detection unit 117 detects the deterioration level due to the coding processing for each frame of the proxy data, and outputs information related to the detected deterioration level to the notification unit 110.

The notification unit 110 detects that the main moving image is not properly coded based on the deterioration level information from the deterioration level detection units 116 and 117 in addition to information about the buffer overflow or underflow from the coding unit 103. Then, the notification unit 110 notifies the multiplexing unit 115 of the relevant information together with information about the corresponding frame number. In response to the output from the notification unit 110, the multiplexing unit 115 multiplexes additional information indicating the buffer failure or image quality deterioration on the proxy data from the coding unit 108. Other configurations and operations are similar to those according to the second exemplary embodiment.

Figure 15:
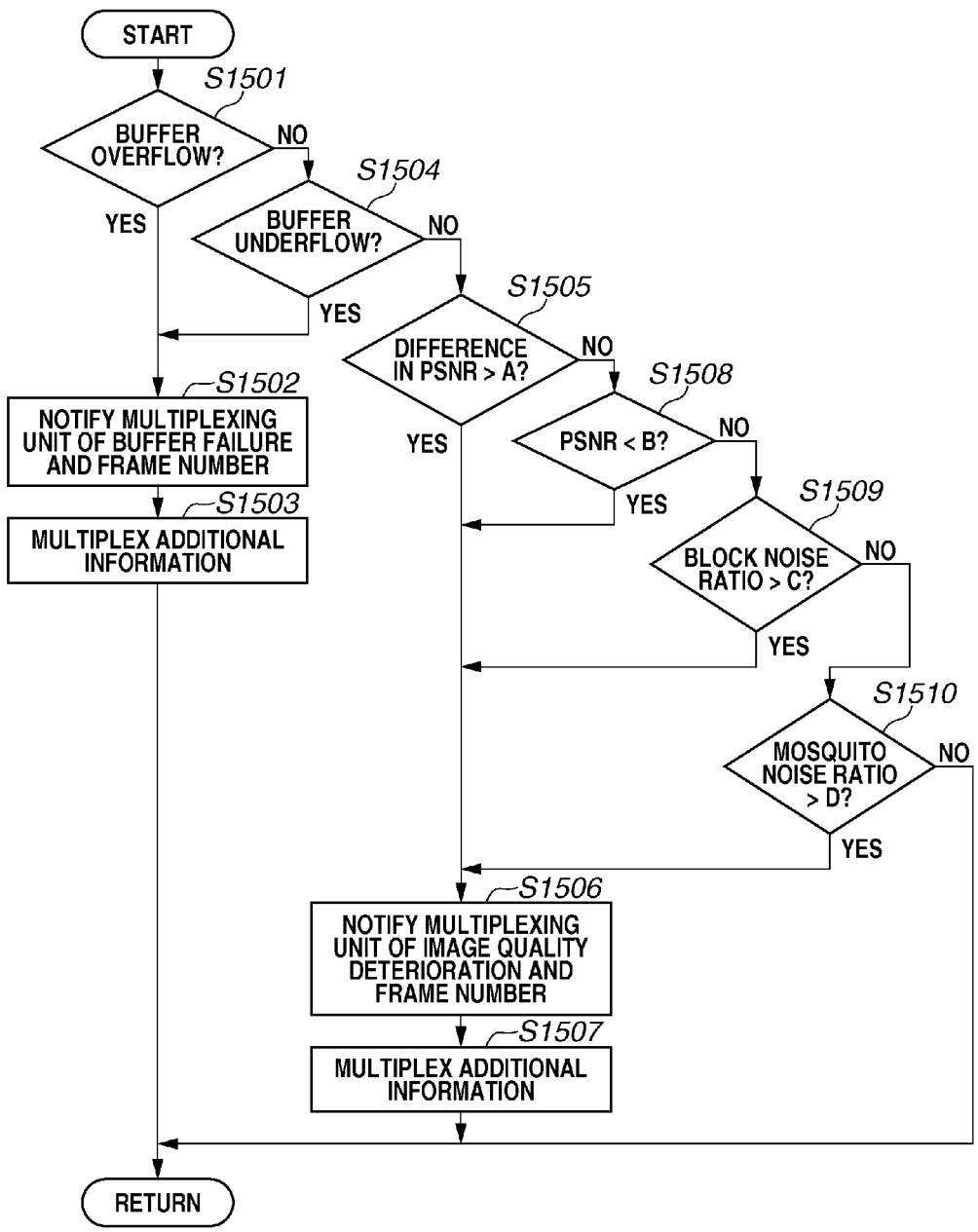
FIG. 15 is a flowchart illustrating an example of processing for image quality deterioration notification according to the sixth exemplary embodiment.

FIG. 15 is a flowchart illustrating processing for image quality deterioration notification during recording of the main moving image and the proxy data. Processing in this flowchart is implemented when the CPU loads a relevant program stored in the nonvolatile memory provided in the control unit 111 into the volatile memory which functions as a work memory, and then executes it.

In step S1501, while the main moving image data and the proxy data are simultaneously recorded as described above, the notification unit 110 determines whether the virtual buffer of the coding unit 103 overflows. If the virtual buffer overflows (YES in step S1501), then in step S1502, the notification unit 110 notifies the multiplexing unit 115 of information about the buffer failure and information about the corresponding frame number. In step S1503, upon reception of the buffer failure notification, the multiplexing unit 115 multiplexes additional information indicating the buffer failure occurrence in the main moving image on the frame having the corresponding frame number among the proxy data from the coding unit 108.

If, on the other hand, the virtual buffer does not overflow (NO in step S1501), then in step S1504, the notification unit 110 determines whether the virtual buffer of the coding unit 103 underflows. If the virtual buffer underflows (YES in step S1504), then in step S1502, the notification unit 110 notifies the multiplexing unit 115 of information about the buffer failure and information about the corresponding frame number. In step S1503, upon reception of the buffer failure notification, the multiplexing unit 115 multiplexes additional information indicating the buffer failure occurrence in the main moving image on the frame having the corresponding frame number among the proxy data from the coding unit 108.

If, on the other hand, the virtual buffer does not underflow (NO in step S1504), then in step S1505, the notification unit 110 determines whether the difference between the PSNR notified from the deterioration level detection unit 116 and the PSNR notified from the deterioration level detection unit 117 is larger than the predetermined value A. If the difference between the two PSNRs is larger than the predetermined value A (YES in step S1505), then in step S1506, the notification unit 110 notifies the multiplexing unit 115 of information about the image quality deterioration of the main moving image and information about the corresponding frame number. In step S1507, upon reception of the image quality deterioration notification, the multiplexing unit 115 multiplexes additional information indicating the image quality deterioration on the frame having the corresponding frame number among the proxy data from the coding unit 108.

If, on the other hand, the difference between the two PSNRs is equal to or smaller than the predetermined value A (NO in step S1505), then in step S1508, the notification unit 110 determines whether the PSNR notified from the deterioration level detection unit 116 is smaller than the predetermined value B. If the PSNR is smaller than the predetermined value B (YES in S1508), then in step S1506, the notification unit 110 notifies the multiplexing unit 115 of information about the image quality deterioration of the main moving image and information about the corresponding frame number. In step S1507, upon reception of the image quality deterioration notification, the multiplexing unit 115 multiplexes additional information indicating the image quality deterioration on the frame having the corresponding frame number among the proxy data from the coding unit 108.

If, on the other hand, the PSNR is equal to or larger than the predetermined value B (NO in step S1508), then in step S1509, the notification unit 110 determines whether the block noise ratio notified from the deterioration level detection unit 116 is larger than the predetermined value C. If the block noise ratio is larger than the predetermined value C (YES in step S1509), then in step S1506, the notification unit 110 notifies the multiplexing unit 115 of information about the image quality deterioration of the main moving image and information about the corresponding frame number. In step S1507, upon reception of the image quality deterioration notification, the multiplexing unit 115 multiplexes additional information indicating the image quality deterioration on the frame having the corresponding frame number among the proxy data from the coding unit 108.

If, on the other hand, the block noise ratio is equal to or smaller than the predetermined value C (NO in step S1509), then in step S1510, the notification unit 110 determines whether the mosquito noise ratio notified from the deterioration level detection unit 116 is larger than the predetermined value D. If the mosquito noise ratio is larger than the predetermined value D (YES in step S1510), then in step S1506, the notification unit 110 notifies the multiplexing unit 115 of information about the image quality deterioration of the main moving image and information about the corresponding frame number. In step S1507, upon reception of the image quality deterioration notification, the multiplexing unit 115 multiplexes additional information indicating the image quality deterioration on the frame having the corresponding frame number among the proxy data from the coding unit 108.

As described above, in the present exemplary embodiment, image quality deterioration of the main moving image due to coding is detected in addition to the buffer failure during coding of the main moving image, and the relevant information is multiplexed on the proxy data. Reproducing such proxy data by using the reproducing apparatus 900 illustrated in FIG. 9 allows the user to easily and appropriately recognize that the main moving image is not properly coded.

Although, in the above-described exemplary embodiments, both the coding unit 103 and the coding unit 108 codes the moving image data according to the H.264 coding method, other coding methods can be used. Further, the coding unit 103 and the coding unit 108 may use different coding methods.

For example, it is possible that the coding unit 103 codes the moving image data with discrete wavelet transform while the coding unit 108 codes the moving image data by using the H.264 coding method. In this case, the deterioration level detection unit 117 detects the deterioration level of coding as described above. On the other hand, in the case of coding methods in which block-unit coding is not performed, such as coding with discrete wavelet transform, block noise cannot be detected and therefore the deterioration level is detected based on the mosquito noise ratio and the PSNR.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096997 filed May 2, 2013, and No. 2014-040760 filed Mar. 3, 2014, which are hereby incorporated by reference herein in their entirety.

What is claimed is:

1. An image processing apparatus comprising:
a processor; and
a memory storing a program which, when executed by the processor, causes the image processing apparatus to:
code first moving image data so that a data amount of the coded first moving image data to be stored in a virtual buffer is a predetermined size;
generate second moving image data having a smaller number of pixels than the first moving image data; and
add, in a case where the first moving image data is not properly coded when the second moving image data is generated while the first moving image data is coded, predetermined information for identifying that the first moving image data is not properly coded, to the second moving image data,
wherein, in a case where the virtual buffer overflows or underflows, the predetermined information is added to the second moving image data.

2. The image processing apparatus according to claim 1, wherein image information for identifying that the first moving image data is not properly coded is added by superimposing on the second moving image data.

3. The image processing apparatus according to claim 2, wherein the image information is added by superimposing on image data of a frame corresponding to a frame in which the first moving image data is not properly coded among the second moving image data.

4. The image processing apparatus according to claim 2, wherein the program when executed by the processor further causes the image processing apparatus to code the second moving image data on which the image information is superimposed.

5. The image processing apparatus according to claim 1, wherein the program when executed by the processor further causes the image processing apparatus to code the second moving image data, and
wherein information for identifying that the first moving image data is not properly coded is added to the coded second moving image data.

6. The image processing apparatus according to claim 1, wherein the program when executed by the processor further causes the image processing apparatus to detect that the first moving image data is not properly coded, and
wherein the adding is performed based on information about a frame in which the first moving image is not properly coded.

7. An image processing apparatus comprising:
a processor; and
a memory storing a program which, when executed by the processor, causes the image processing apparatus to:
code first moving image data;
generate second moving image data having a smaller number of pixels than the first moving image data;
code the second moving image data;
add, in a case where the first moving image data is not properly coded when the second moving image data is generated while the first moving image data is coded, predetermined information for identifying that the first moving image data is not properly coded, to the second moving image data;
detect, based on an image quality deterioration level of each of the first moving image data and the second moving image data due to the coding, that the first moving image data is not properly coded, and
determine, in a case where a difference between the deterioration level of the first moving image data and the deterioration level of the second moving image data is larger than a predetermined value, that the first moving image data is not properly coded,
wherein, based on the result of the determination, the predetermined information is added to the second moving image data.

8. An image processing apparatus comprising: a processor; and a memory storing a program which, when executed by the processor, causes the image processing apparatus to:
code first moving image data;
generate second moving image data having a smaller number of pixels than the first moving image data;
detect image quality deterioration of the coded first moving image data; and
add, in a case where the image quality deterioration of the first moving image data is detected when the second moving image data is generated while the first moving image data is coded, predetermined information for identifying the image quality deterioration of the first moving image data, to the second moving image data.

9. The image processing apparatus according to claim 8, wherein image information for identifying the image quality deterioration of the first moving image data is added by superimposing on the second moving image data.

10. The image processing apparatus according to claim 9, wherein the image information is added by superimposing on image data of a frame corresponding to a frame in which the image quality deterioration of the first moving image data is detected among the second moving image data.

11. The image processing apparatus according to claim 9, wherein the program when executed by the processor further causes the image processing apparatus to code the second moving image data on which the image information is superimposed.

12. The image processing apparatus according to claim 8, wherein the program when executed by the processor further causes the image processing apparatus to code the second moving image data to which information for identifying the image quality deterioration of the first moving image data is added.

13. The image processing apparatus according to claim 8, wherein the adding is performed based on information about a frame in which the image quality deterioration of the first moving image data is detected.

14. The image processing apparatus according to claim 8, wherein an image quality deterioration level of the first moving image data is detected due to coding, and, based on the image quality deterioration level of the first moving image data, the predetermined information is to the second moving image data.

15. The image processing apparatus according to claim 14, wherein the program when executed by the processor further causes the image processing apparatus to code the second moving image data, and
wherein an image quality deterioration level of the second moving image data is further detected due to coding, and, in a case where a difference between the image quality deterioration level of the first moving image data and the image quality deterioration level of the second moving image data is larger than a predetermined value, determines that the first moving image data is deteriorated.

16. The image processing apparatus according to claim 14, wherein, in a case where the image quality deterioration level of the first moving image data exceeds a predetermined level, the image quality of the first moving image data is deteriorated is determined.

17. An image processing method comprising:
coding first moving image data so that a data amount of the coded first moving image data to be stored in a virtual buffer is a predetermined size;
generating second moving image data having a smaller number of pixels than the first moving image data; and
adding, in a case where the first moving image data is not properly coded when the second moving image data is generated while the first moving image data is coded, predetermined information for identifying that the first moving image data is not properly coded, to the second moving image data,
wherein, in a case where the virtual buffer overflows or underflows, the predetermined information is added to the second moving image data.

18. An image processing method comprising:
coding first moving image data;
generating second moving image data having a smaller number of pixels than the first moving image data; and
detecting image quality deterioration of the coded first moving image data; and
adding, in a case where the image quality deterioration of the first moving image data is detected when the second moving image data is generated while the first moving image data is coded, predetermined information for identifying the image quality deterioration of the first moving image data, to the second moving image data.

19. An image processing method comprising:
coding first moving image data;
generating second moving image data having a smaller number of pixels than the first moving image data;
coding the second moving image data;
adding, in a case where the first moving image data is not properly coded when the second moving image data is generated while the first moving image data is coded, predetermined information for identifying that the first moving image data is not properly coded, to the second moving image data;
detecting, based on an image quality deterioration level of each of the first moving image data and the second moving image data due to the coding, that the first moving image data is not properly coded, and
determining, in a case where a difference between the deterioration level of each of the first moving image data and the deterioration level of the second moving image data is larger than a predetermined value, that the first moving image data is not properly coded,
wherein, based on the result of the determining, the predetermined information is added to the second moving image data.

* * * * *